Patented Jan. 20, 1942

2,270,570

UNITED STATES PATENT OFFICE 2,270,570

ARYLSULPHONAMIDE AZO DYE INTERMEDIATES

Byron L. West, Plainfield, and Dale R. Eberhart, Middlesex, N. J., assignors, by mesne assignments, to American Cyanamid Company, New York, N. Y., a corporation of Maine No Drawing. Application May 23, 1939, Serial No. 275,153

2 Claims. (Cl. 260—247)

This invention relates to azo dyestuff intermediates, and more particularly to intermediates for acid wool dyes.

We have found, according to the present invention, that compounds having the following general formula:

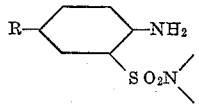

in which R is nitro, amino or acylamino and

is part of a heterocyclic ring make excellent dyestuff intermediates.

The preferred modifications of the present invention are those intermediates having the following general formula:

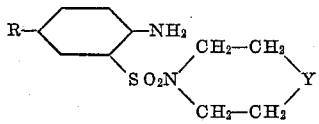

in which R is nitro, amino or acylamino and Y is O and S, but it should be understood that the invention is not limited to these preferred compounds.

The products of the present invention may be prepared by reacting 2-chloro-5-nitrobenzene sulphonyl chloride with a heterocyclic secondary amine under such conditions that the 2-chlorine atom will not react, and then reacting the chlorine atom with ammonia. If desired, the nitro group may then be reduced or reduced and acylated.

When these intermediates are diazotized and coupled onto aromatic coupling components, azo dyestuffs are obtained which have, in general, very satisfactory properties. In the case of intermediates where R is acylamino, the azo dyestuffs derived therefrom possess superior lightfastness. If the coupling component is a radical of the naphthalene series containing one or more sulphonic acid groups, the dyes so produced dye wool in red to violet shades and are particularly applicable to carpet dyeing. It should be understood that the dyes themselves are not claimed in the present application.

The invention will be described in greater detail in conjunction with the following specific examples which are illustrations only and are not intended to limit the scope of the invention. Parts are by weight except in the case of liquids where they are by the corresponding volume.

Example 1

256 parts of 4-nitro-chlorobenzene-2-sulphon chloride are added to 450 parts of water at room temperature and 90 parts of morpholine are then added. A 20% sodium hydroxide solution is added with agitation until the pH of the mixture is between 9 and 11. After stirring for 10 minutes, the mixture is heated to 90° C. during about 1 hour, keeping the pH of the reaction between 9 and 11 by the addition of sodium hydroxide solution. Between the temperatures of 72° and 75° C. the reaction may become too vigorous; in this case, heating is stopped and ice added to keep the temperature from rising too rapidly. About 40 parts of sodium hydroxide are required. When the reaction is complete, the batch is cooled to 70° C., filtered and washed until free of alkali.

The 4-nitro-chlorobenzene-2-sulphonmorpholide thus prepared is charged into a suitable autoclave along with 900 parts of water and 255 parts of 29.9% ammonium hydroxide. The batch is then heated to 100° C. in about 1 hour, to 130° C. in an additional 30 minutes, and held at 130° C. for 10 hours. The maximum pressure developed is about 60 pounds. After cooling to 60°–75° C., the autoclave is discharged and the batch is filtered, washed until free of alkali, and dried in air at 70°–80° C.

Example 2

100 parts of p-nitroaniline-o-sulphonmorpholide are added to a solution of 600 parts stannous chloride crystals in 600 parts of 36% hydrochloric acid. The temperature is raised to 60°–80° C. and held within this range until reduction is complete. On cooling, a white precipitate forms which is filtered to remove excess acid, then dissolved in a minimum amount of water, and H₂S is passed in to precipitate tin. Filtration gives a colorless solution of the diamine hydrochloride. Evaporation to the point of crystallization gives white crystalline plates which by oxidation with dichromate give blue black color typical of p-diamines. The product is of value as a fur dye.

*Example 3*

100 parts of the diamine hydrochloride prepared according to Example 2 are dissolved in 200 parts of water and 40 parts of acetic anhydride are added at once followed by the careful addition of 40 parts Na2CO3 as 20% solution. The temperature is held at 25°–30° C. until acetylation of the 4-amino group is complete. On longer stirring the product crystallizes out and is then filtered. Recrystallization from dilute alcohol gives a white product crystallizing in long needles, often tapered. This product is of great value as a diazo component in producing azo dyes of exceptional light fastness.

In the above examples a nitro-chlorobenzene sulphon chloride is employed as the starting material. The chlorine substituted compound is used because it is cheap and readily available but it should be understood that the present invention is not limited thereto and the bromine substituted compound is equally effective.

What we claim is:

1. An azo dye intermediate having the following general formula:

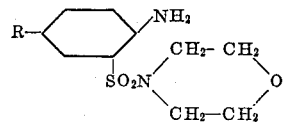

in which R is a member of the group consisting of nitro, amino and acylamino.

2. An azo dye intermediate having the following general formula:

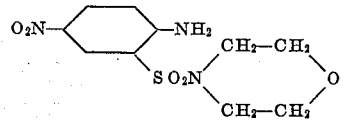

BYRON L. WEST.
DALE R. EBERHART.